US011850944B2

United States Patent
Duan

(10) Patent No.: US 11,850,944 B2
(45) Date of Patent: Dec. 26, 2023

(54) HYBRID POWER SYSTEM FOR USE IN VEHICLE AND CONTROL METHOD THEREOF

(71) Applicants: Beijing National New Energy Vehicle Technology Innovation Center Co., Ltd., Beijing (CN); Zhihui Duan, Beijing (CN)

(72) Inventor: Zhihui Duan, Beijing (CN)

(73) Assignees: Beijing National New Energy Vehicle Technology Innovation Center Co., Ltd., Beijing (CN); Zhihui Duan, Beijing (CN)

( * ) Notice: Subject to any disclaimer, the term of this patent is extended or adjusted under 35 U.S.C. 154(b) by 0 days.

(21) Appl. No.: 17/761,648

(22) PCT Filed: Sep. 10, 2020

(86) PCT No.: PCT/CN2020/114507
§ 371 (c)(1),
(2) Date: Mar. 18, 2022

(87) PCT Pub. No.: WO2021/052239
PCT Pub. Date: Mar. 25, 2021

(65) Prior Publication Data
US 2022/0332183 A1 Oct. 20, 2022

(30) Foreign Application Priority Data
Sep. 20, 2019 (CN) .......................... 201910892587.4

(51) Int. Cl.
*B60K 6/365* (2007.10)
*B60K 6/48* (2007.10)
(Continued)

(52) U.S. Cl.
CPC ................ *B60K 6/48* (2013.01); *B60K 6/365* (2013.01); *B60K 6/38* (2013.01); *B60K 6/547* (2013.01);
(Continued)

(58) Field of Classification Search
CPC . B60K 6/48; B60K 6/365; B60K 6/36; B60K 6/547; B60K 6/54;
(Continued)

(56) References Cited

U.S. PATENT DOCUMENTS 8,585,522 B2 * 11/2013 Kaltenbach .............. B60K 6/48
475/5
2013/0109530 A1 5/2013 Kaltenbach et al.
(Continued)

FOREIGN PATENT DOCUMENTS

CN  102059940 A     5/2011
CN  106864247 A  *  6/2017
(Continued)

OTHER PUBLICATIONS

English translation of CN106864247A; http://translationportal.epo.org; Jul. 11, 2023 (Year: 2023).*
(Continued)

*Primary Examiner* — Roger L Pang

(57) ABSTRACT

A hybrid power system comprises an engine, a hybrid power module, and a dual input shaft speed change mechanism. The hybrid power module comprises a motor, a planetary gear system, and a first clutch. The planetary gear system is provided with at least three rotating shafts, which respectively are: a rotating shaft X1, a rotating shaft X2, and a rotating shaft X3. The first clutch is arranged between any two of the three rotating shafts. A power output shaft of the engine is connected to the rotating shaft X3 or the rotating shaft X1 and to a second input shaft of the dual input shaft
(Continued)

speed change mechanism. A rotor of the motor is connected to the rotating shaft X1 or to the rotating shaft X3. The rotating shaft X2 is connected to a first input shaft of the dual input shaft speed change mechanism.

11 Claims, 11 Drawing Sheets

(51) Int. Cl.
*B60K 6/38* (2007.10)
*B60K 6/547* (2007.10)
*F16H 61/04* (2006.01)

(52) U.S. Cl.
CPC .............. *B60K 2006/4825* (2013.01); *F16H 2061/0411* (2013.01); *F16H 2061/0422* (2013.01)

(58) Field of Classification Search
CPC .... B60K 2006/4816; B60K 2006/4825; F16H 2003/123; F16H 3/126; F16H 3/872; F16H 37/065; F16H 2037/047; F16H 2037/048
USPC ................................................ 475/5; 74/330
See application file for complete search history.

(56) References Cited

U.S. PATENT DOCUMENTS

2019/0225069 A1  7/2019  Duan
2022/0340121 A1* 10/2022  Duan ..................... B60K 6/48

FOREIGN PATENT DOCUMENTS

CN        105346538 B    11/2017
DE        102011085199 A1   5/2013

OTHER PUBLICATIONS

International Search Report of PCT Patent Application No. PCT/CN20201114507 dated Dec. 30, 2020.

* cited by examiner

HYBRID POWER SYSTEM FOR USE IN VEHICLE AND CONTROL METHOD THEREOF

FIELD OF TECHNOLOGY

The present invention relates to the technical field of hybrid power vehicles, in particular to a hybrid power system for use in a vehicle and a control method thereof.

BACKGROUND

A hybrid power vehicle has two power sources, which are an engine and a motor. Through the cooperation between the two power sources during vehicle driving, the hybrid power vehicle combines advantages of a traditional fuel vehicle and a pure electric vehicle, becomes a best solution to environmental and energy problems and is the power system with the most industrialization and marketization prospects in electric vehicles.

In the prior art, a DCT (Dual Clutch Transmission, DCT for short) hybrid power gearbox is widely used in the power drive system of the hybrid power vehicle, which is composed of adding a motor in front of a dual clutch of the DCT (dual clutch transmission) and adding a clutch in front of the motor, resulting in gear transmission, high efficiency, less energy loss caused by clutch drag resistance, less hydraulic energy consumption, parallel driving of the engine and motor, a superimposed torque, and good dynamic performance. The DCT technology is mature and large-scale production is realized. The quality of parts and assemblies is stable, and cost is low. However, there are the following disadvantages: 1. The dual-clutch control technology is complex, risky and costly. 2. The diameter and volume of the dual-clutch are large; after adding the motor, the axial length is large, and a layout in an engine compartment is difficult; 3. When the engine-driven vehicle starts, it is difficult to control the sliding friction of the dual clutch, which is prone to jitter; when shifting gears, the switching of the two clutches is also likely to cause the jitter; 4. Under normal circumstances, limited by the axial length and cost, it can only have 6 or 7 gear positions; between low gear positions, a speed ratio difference is large, and the fuel consumption in urban road conditions is bad.

SUMMARY

In order to solve the above problems, the purposes of the present invention are to provide a hybrid power system for use in a vehicle with high transmission efficiency, multiple gear positions, a compact structure and mature component technology, and at the same time disclose a control method of the above hybrid power system for use in the vehicle, also disclose a vehicle comprising the hybrid power system.

For realizing the above purposes of the invention, the present invention adopts following technical schemes:

A hybrid power system for use in a vehicle, wherein the system comprises an engine, a hybrid power module, and a dual input shaft speed change mechanism, the hybrid power module comprises an motor, a planetary gear system, a first clutch, and a brake, the planetary gear system is provided with at least three rotating shafts, which respectively are: rotating shaft X1, rotating shaft X2, and rotating shaft X3, the axial lines of the three rotating shafts being on a straight line, and the rotational speed of rotating shaft X2 falling between the rotational speed of rotating shaft X1 and the rotational speed of rotating shaft X3; the first clutch is arranged between any two of the three rotating shafts; a power output shaft of the engine is connected to rotating shaft X3 or rotating shaft X1 of the planetary gear system and to a second input shaft of the dual input shaft speed change mechanism, a rotor of the motor is connected to rotating shaft X1 or to rotating shaft X3, rotating shaft X2 is connected to a first input shaft of the dual input shaft speed change mechanism; the brake is installed on the power output shaft of the engine; the dual input shaft speed change mechanism comprises a first input shaft, a second input shaft, several pairs of gears in forward gear positions, at least one set of gears in reverse gear positions and an output shaft, the first input shaft is provided with a driving gear in an odd-numbered gear, the second input shaft is provided with a driving gear in an even-numbered gear position, and the output shaft is arranged with driven gears in respective gear positions, and the driving gears in the respective gear positions are meshed with the corresponding driven gears.

Further, the driving gears in the gears in reverse gear positions are arranged on the first input shaft.

Further, one gear in each gear position is connected to the shaft on which the gear is located through a synchronizer.

Further, the output shaft comprises a first output shaft and a second output shaft, which are respectively arranged with several driven gears.

Further, the first input shaft comprises a front section of the first input shaft and a rear section of the first input shaft, the front section of the first input shaft is driven to the rear section of the first input shaft through a chain or a two-stage gear; and driving gears in the odd-numbered gear positions are arranged on the rear section of the first input shaft; or the second input shaft comprises a front section of the second input shaft and a rear section of the second input shaft, the front section of the second input shaft is transmitted to the rear section of the second input shaft through a chain or a two-stage gear; and driving gears in the even-numbered gear positions are arranged on the rear section of the second input shaft.

Further, the first input shaft comprises a front section of the first input shaft and a rear section of the first input shaft, the second input shaft comprises a front section of the second input shaft and a rear section of the second input shaft; the front section of the first input shaft is transmitted to the rear section of the first input shaft through a gear or a chain, and the front section of the second input shaft is transmitted to the rear section of the second input shaft through a gear or a chain; the rear section of the first input shaft is arranged with a driving gear in an odd-numbered gear position; the rear section of the second input shaft is arranged with a driving gear in an even-numbered gear position.

Further, in the hybrid power module, the planetary gear system has at least three rotating shafts, which respectively are: the rotating shaft of sun gear S, the rotating shaft of planetary carrier C, and the rotating shaft of the ring gear R, and the axis lines of the three rotating shafts are on a straight line, the rotating shaft speed of the planetary carrier C is between the rotating shaft speed of the sun gear S and the rotating shaft speed of the ring gear R, and the first clutch is arranged between any two of the three rotating shafts; the power output shaft of the engine is connected to the rotating shaft of the ring gear R in the planetary gear system or the rotating shaft of sun gear S and to the second input shaft of the dual input shaft speed change mechanism, the rotor of the motor is connected with the rotating shaft of sun gear S or the rotating shaft of the ring gear R in the planetary gear system, and the rotating shaft of planetary carrier C is connected with the first input shaft of the dual input shaft gearbox.

For the hybrid power system for use in a vehicle, the brake in the hybrid power module is replaced by a second clutch mounted on the power output shaft of the engine.

Further, operating modes of the hybrid power system comprises: a pure electric mode, a pure engine driving mode, a hybrid power driving mode, and a charging mode.

Further, working conditions of the above pure electric mode are: the engine does not work and the speed is zero; the hybrid power system is in an odd-numbered gear position, the first clutch is disengaged, and the planetary gear system rotates differentially; the brake is closed, and the rotation of the power output shaft of the engine is restricted; the torque of the motor acts on the rotating shaft of the sun gear, making it tend to rotate in a forward direction; the sun gear drives the planetary gear to rotate, and the planetary gear tends to drive the ring gear to rotate in a reverse direction; and the brake limits the reverse rotation of the ring gear, forcing the planetary carrier to rotate in the forward direction.

Further, working conditions of the above hybrid power driving mode are: when the engine and motor drive the vehicle to start in a hybrid manner, the hybrid power system is shifted to D gear position, the gearbox is in first gear, and the first clutch is disengaged; before starting, the wheels are at zero speed and the first input shaft and the planetary carrier are at zero speed, the engine is idling, and the motor rotates in a reverse direction; beginning to start: the engine increases the torque, the motor also increases the torque and increases the speed, drives the planetary carrier and the first input shaft to accelerate, and through the gearbox, drives the wheels to rotate, at this time, the engine and the motor are driving at different speeds, the speed ratio between the engine and the wheels can be continuously changed; when the speed of the planetary carrier reaches a certain speed, the first clutch is closed, the speed ratio between the engine and the wheels is fixed, and the gear is fixed in the first gear position.

Further, under the condition of the above hybrid drive mode of the engine and the motor, operation steps in the fixed gear position are as follows: the hybrid power system is engaged in an odd-numbered gear position or an even-numbered gear position, the first clutch is closed, and the three rotating shafts in the planetary gear train are rotating at the same speed. Torques of engine and motor act on the rotating shaft of the sun gear and the rotating shaft of the ring gear respectively, are superimposed through the planetary gear train, and are transmitted to the wheels through the first input shaft or the second input shaft and the gear in the corresponding gear position.

Also provided in the present invention is a control method for a hybrid power system for use in a vehicle, wherein, in the hybrid power driving mode, the steps of shifting gear positions are:

1. changing from the odd-numbered gear position to an adjacent even-numbered gear position
   (1) before shifting the gear position: the synchronizer is in the odd-numbered gear position, the first clutch is closed, the planetary gear system is locked, and the engine and the motor parallelly drive the gear in the gear position;
   (2) starting to shift the gear position: the torques of the engine and the motor are adjusted so that $Tm=\rho Ten$, the torque borne by the first clutch is reduced to zero, and the sum of the adjusted torques is equal to the sum of the torques before the adjustment; where Tm is the motor driving torque, $\rho=S/R$, R and S represent the number of teeth of the ring gear and sun gear respectively, and Ten is the engine driving torque;
   (3) the first clutch is released, and the engine and the motor are driven at different speeds; during this process, the torques of the motor and engine are balanced around the shaft of the planetary carrier, and the driving torque is equal to the torque before shifting the gear position;
   (4) the motor adjusts the speed of the rotating shaft of the sun gear, and then drives the rotating shaft of the ring gear and the second input shaft to adjust the speeds, so that the second input shaft is synchronized with the gear in a new gear position; in this process, the torques of the motor and the engine are balanced around the shaft of the planetary carrier, the driving torque is equal to the torque before shifting the gear position; the engine controls the torque, the motor controls the speed of the sun gear, and controls the speed of the ring gear through the planetary gear system, so that the second input shaft and the gear to be shifted to the even-numbered gear position rotate at the same speed, which is convenient for the gear position synchronizer to shift the gear position smoothly;
   (5) the synchronizer is in a new gear position, and the torque remains unchanged during this process;
   (6) the torque output by the motor is transferred to the power output shaft of the engine, the engine directly drives the second input shaft and the gear in the new gear position, the torque of the motor becomes zero, and the torques on the first input shaft and the gear in the original odd-numbered gear position are zero; in this process, the torque of the motor is transferred to the engine, and the driving torque is equal to the torque before shifting the gear position;
   (7) the synchronizer removes the original odd-numbered gear position;
   (8) the first clutch is closed, the planetary gear system is locked, and the engine and the motor parallelly drive the new gear in the new gear position; in this process, the torques of the motor and the engine can be adjusted and balanced, and the driving torque is equal to the torque before shifting the gear position;
2. changing from the odd-numbered gear position to the adjacent even-numbered gear position
   (1) before shifting: the synchronizer is in the even-numbered gear, the first clutch is closed, the planetary gear system is locked, and the engine and the motor parallelly drive the gear position;
   (2) starting to shift the gear position: the torque output by the motor is transferred to the power output shaft of the engine, the engine directly drives the second input shaft and the gear in the original gear position, the torque of the motor becomes zero, and the torque on the clutch are zero; in this process, the torque of the motor is transferred to the engine, and the driving torque is equal to the torque before shifting the gear position;
   (3) the first clutch is released, and the three rotating shafts of the planetary gear system rotate at different speeds, and the torque remains unchanged during this process;
   (4) the motor adjusts the speed of the rotating shaft of the sun gear, and then drives the rotating shaft of the planetary carrier and the first input shaft to adjust the speeds, so that the first input shaft is synchronized with the gear in the new gear position; in this process, the torque of the engine directly acts on the second input shaft, wheels are driven through the gears in the even-numbered positions, and the torque is equal to the torque before shifting the gear position;

(5) the synchronizer is in a new gear position, and the torque remains unchanged during this process;

(6) the torques of the engine and the motor are adjusted so that Tm=ρTen, and the sum of the adjusted torques is equal to the sum of the torques before the adjustment, so that the torques on the second input shaft and the gear in the original gear position are reduced to zero, where Tm is the driving torque of the motor, ρ=S/R, R and S represent the number of teeth of the ring gear and sun gear respectively, Ten is the engine drive torque;

(7) the original odd-numbered gear position is removed, and the torque remains unchanged during this process;

(8) the first clutch is closed, the planetary gear system is locked, and the torques of the engine and the motor parallelly drive the new gear in the new gear position; in this process, the torques of the motor and the engine can be adjusted and balanced, and the driving torque is equal to the torque before shifting the gear position.

In the control method for a hybrid power system for use in a vehicle, the steps of switching from the pure electric mode to the hybrid power driving mode are:

(1) before the switching, the synchronizer is in an odd-numbered gear position, the first clutch is disengaged, the brake locks the power output shaft of the engine, the motor drives the sun gear, and drives the first input shaft and the shifted gear through the planetary carrier;

(2) starting the switching: the brake is released, the first clutch is closed, and the three rotating shafts in the planetary gear system tend to rotate at the same speed, the power output shaft of the engine is driven to accelerate;

(3) the sliding friction torque of the first clutch is limited, and at the same time, the motor increases the torque to compensate for torque loss;

(4) when the power output shaft of the engine reaches an ignition speed, the engine ignites and starts to work, and the hybrid power system enters the hybrid power driving mode.

In the control method for a hybrid power system for use in a vehicle, the steps of switching from the hybrid power driving mode to the pure electric mode are:

(1) before the switching: the hybrid power system is in an odd-numbered gear position, the synchronizer is in an odd-numbered gear position, the first clutch is closed, the brake is disengaged, and the engine and motor are driven in parallel;

(2) starting the switching: the first clutch is released, the engine is turned off; the brake is closed, and the speed of the power output shaft of the engine is decreased to be zero and locked;

(3) the motor continues to drive the sun gear, and the system switches to the pure electric mode.

Also protected in the present invention is a vehicle comprising the above hybrid power system.

Due to adopting the above technical schemes, the present invention has the following advantages:

The hybrid power system for use in a vehicle and a control method thereof have high transmission efficiency, multiple gear positions, a compact structure and mature component technology, reasonable design, and the three-axis dual-degree-of-freedom planetary gear system is introduced, so that the engine and the motor can drive the vehicle to start at differential speeds, the vehicle starts smoothly, and the clutch is no longer required to drive the vehicle to start with the sliding friction; the entire shifting process of the gearing position is controlled by the motor for speed regulation. After the input shaft and the gear are synchronized, the synchronizer directly engages the gear without clutch assistance. The motor has fast response and high speed regulation accuracy, so the shifting of the gear position is smooth and the impact is small; during the shifting process of the gear position, the torque can be transferred between the engine and the motor, so that the driving torque remains unchanged throughout the shifting process of the gear position, and the vehicle stably drives; double clutches are eliminated to reduce costs; the planetary gear system can be arranged inside the motor rotor, saving space, shortening the shaft length, and further reducing the energy consumption of the hydraulic system; the dual-input gearbox has multiple gear positions, which is conducive to reducing the fuel consumption of the whole vehicle, and the size in the axial direction is short; the planetary gear system increases the torque of the engine to improve the fuel consumption of the whole vehicle; the engine and the motor differentially drives, and the speed can be continuously changed during the speed-up process, which further reduces the fuel consumption in urban conditions; the planetary gear system increases the torque of the motor by 2 to 3 times, and the torque of the motor can be reduced by 25-50%, which reduces motor cost; it realizes the pure electric drive, the hybrid drive of the engine and motor, energy regenerative braking, cruise power generation, parking for power generation and other functions.

In the figures: 1—engine; 2—power output shaft; 3—brake; 4—first clutch; 5—planetary gear system; 6—motor; 7—rotor; 8—second clutch; 10—hybrid power module; 11—first input shaft; 12—second input shaft; 15—output shaft; 16—first output shaft; 17—second output shaft; 20—dual input shaft speed change mechanism; S—sun gear; C—planetary carrier; R—ring gear.

DESCRIPTION OF THE EMBODIMENTS

The technical schemes of the present invention will be described in further detail below with reference to the accompanying drawings and embodiments.

Figure 1:
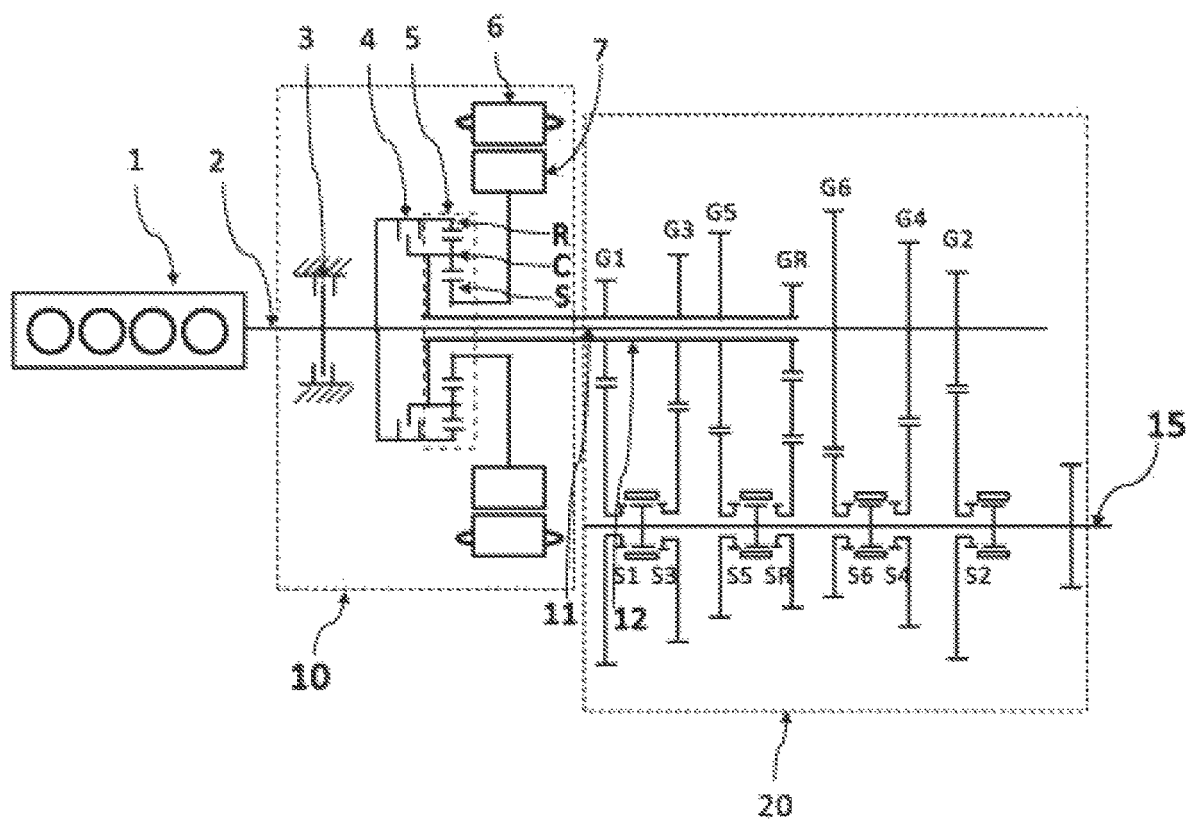
FIG. 1 is a schematic structural diagram of a first embodiment of a hybrid power system for use in a vehicle according to the present invention.

As shown in FIG. 1, a hybrid power system for use in a vehicle comprises an engine 1, a hybrid power module 10, and a dual input shaft speed change mechanism 20, the hybrid power module 20 comprises a motor 6, a planetary gear system 5, a first clutch 4, and a brake 3, the planetary gear system 5 is provided with at least three rotating shafts, and the axial lines of the three rotating shafts are on a straight line. The three rotating shafts are the rotating shaft of sun gear S, the rotating shaft of planetary carrier C, and the rotating shaft of ring gear R. The power output shaft 2 of the engine 1 is connected with the rotating shaft of ring gear R, and is connected with a second input shaft of the dual input shaft speed change mechanism 20. A rotor 7 of the motor 6 is connected with the rotating shaft of sun gear S, the rotating shaft of planetary carrier C is connected with a first input shaft 11 of the dual input shaft speed change mechanism 20, the first clutch 4 is arranged between rotating shafts of any two of sun gear S, planetary carrier C and ring gear R. It is used to lock the three rotating shafts of the planetary gear system together and rotate at the same speed. The brake 3 is installed on the power output shaft 2 of the engine 1. The dual input shaft speed change mechanism 20 comprises a first input shaft 11, a second input shaft 12, several pairs of gears in forward gear positions, at least one set of gears GRs in reverse gear positions and an output shaft 15, and a steering gear is provided between two gears in one set of gears GRs in reverse gear positions. The gears in the forward gear positions are respectively gears G1, G2, G3, The steering gear is provided between the two gears in one set of gears GRs in reverse gear positions. The first input shaft 11 is provided with a driving gear in an odd-numbered gear position and a driving gear in a reverse gear position. The second input shaft 12 is provided with a driving gear in an even-numbered gear position, and the output shaft 15 is arranged with driven gear of each gear position. The driving gear of each gear position and its corresponding driven gear mesh with each other. In each gear position, one gear is connected to the shaft where the gear is located through a synchronizer. When the synchronizer is in a gear position, the gear is connected to the corresponding shaft and rotates at the same speed. When the synchronizer removes the gear position, the gear is separated from the corresponding shaft.

Figure 2:
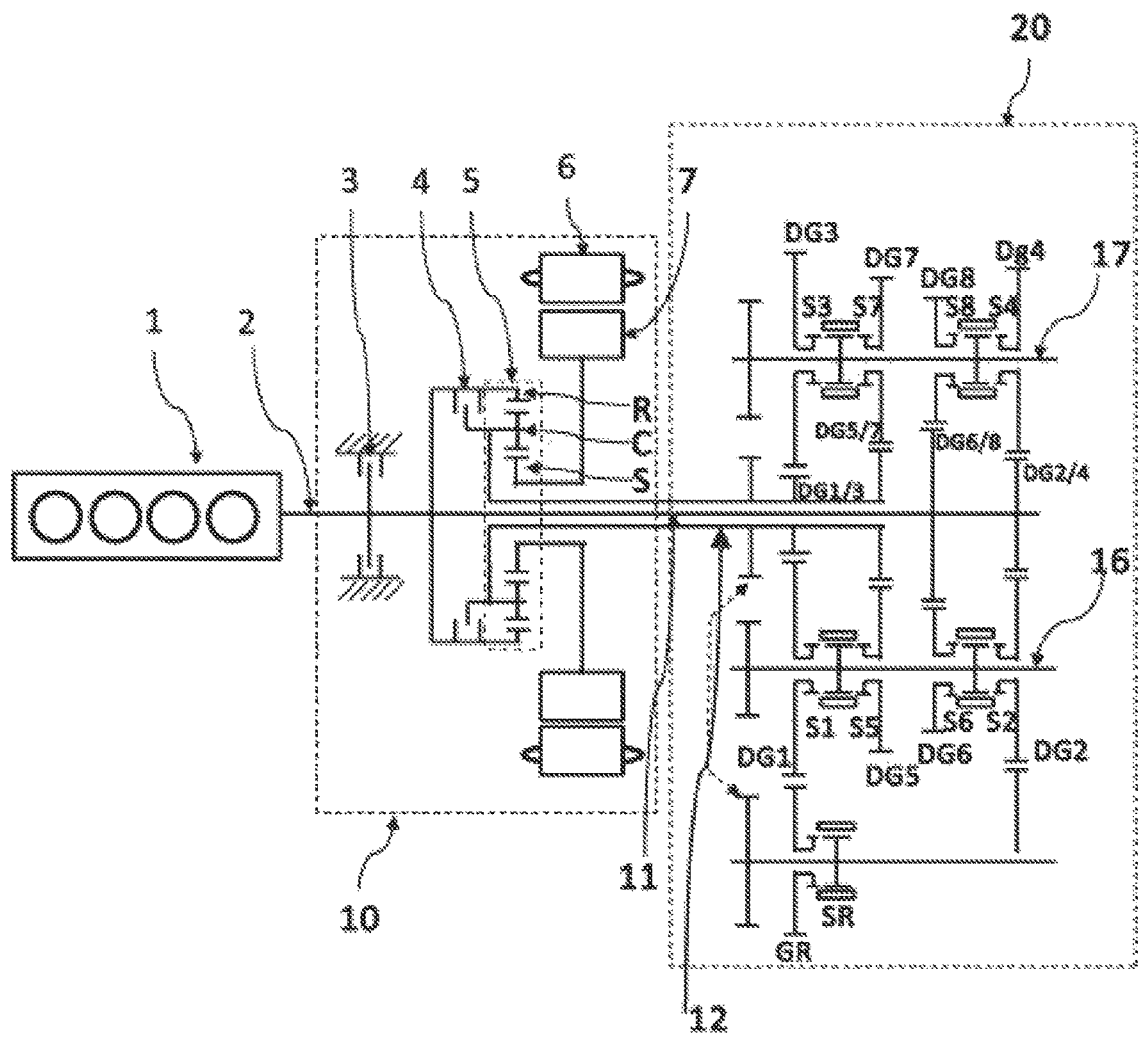
FIG. 2 is a schematic structural diagram of a second embodiment of a hybrid power system for use in a vehicle according to the present invention.

As shown in FIG. 2, a hybrid power system for use in a vehicle comprises an engine 1, a hybrid power module 10, and a dual input shaft speed change mechanism 20, the hybrid power module 20 comprises an motor 6, a planetary gear system 5, a first clutch 4, and a brake 3, the planetary gear system 5 is provided with at least three rotating shafts, which respectively are: the rotating shaft of sun gear S, the rotating shaft of planetary carrier C, and the rotating shaft of ring gear R, and the axial lines of the three rotating shafts are on a straight line. The power output shaft 2 of the engine 1 is connected with the rotating shaft of ring gear R, and is connected with a second input shaft 12 of the dual input shaft speed change mechanism 20. A rotor 7 of the motor 6 is connected with the rotating shaft of sun gear S, the rotating shaft of planetary carrier C is connected with a first input shaft 11 of the dual input shaft speed change mechanism 20, the first clutch 4 is arranged between any two rotating shafts of the planetary gear system. It is used to lock the three rotating shafts of the planetary gear system together so as to rotate at the same speed. The brake 3 is installed on the power output shaft 2 of the engine 1. The dual input shaft speed change mechanism 20 comprises a first input shaft 11, a second input shaft 12, several pairs of gears in forward gear positions, at least one set of gears GRs in reverse gear positions and a first output shaft 16 and a second output shaft 17, and a steering gear is provided between two gears in one set of gears GRs in reverse gear positions. Driving gears DG1/3 and DG5/7 in odd-numbered gear positions are fixed on the first input shaft 11, and driven gears DG2/4 and DG6/8 in even-numbered gear positions are fixed on the second input shaft, and the first output shaft 16 is arranged with driven gears DG1, DG5, DG2, DG6, and all driven gears are connected to the shaft through respective synchronizers S1, S5, S2, S6. The second output shaft 17 is arranged with driven gears DG3, DG7, DG4, DG8, and all driven gears are connected to the shaft through respective synchronizers S3, S7, S4, S8. Driving gear DG1/3 meshes with driven gears DG1, DG3, driving gear DG5/7 meshes with driven gears DG5, DG7, driving gear DG2/4 meshes with driven gears DG2, DG4, and driving gear DG6/8 meshes with the driven gears DG6, DG8. Each driving gear meshes with two driven gears, thereby reducing occupied axial space. The output gears of the first output shaft 16 and the second output shaft 17 mesh with a main reduction gear;

each driving gear meshes with two passive gears to form two gear positions. There are a total of four groups, which means eight gear positions, and the required number of gears is small. Four rows of gears and two pairs of synchronizers are arranged along the axial direction, and the size in the axial direction is compact; and the change of the speed ratio between the gear positions is also reasonable, as shown in Table 1.

Figure 5:
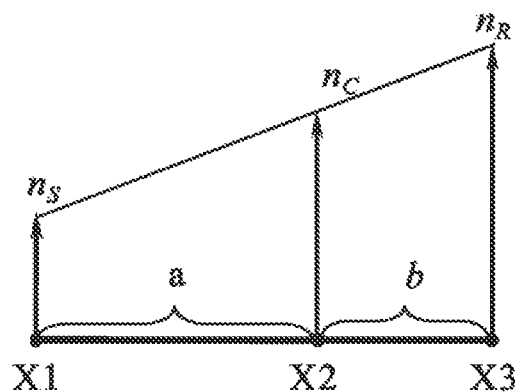
FIG. 5 is a lever representation diagram of the rotational speeds of three rotating shafts in a general planetary gear system.

As shown in FIG. 5, generally speaking, one planetary gear system has at least 3 rotating shafts, which respectively are: rotating shaft X1, rotating shaft X2, rotating shaft X3, and the axial lines of the three rotating shafts are on a straight line. There are kinematic constraints among the rotational speeds of the three rotating shafts, which can be represented by a lever diagram method: a lever is placed horizontally, and there are three points X1, X2, and X3 on

TABLE 1

| Gear position | CL. | S1 | S2 | S3 | S4: | 85 | S6 | 87 | S8 | Total speed ratio | Change ratio |
|---|---|---|---|---|---|---|---|---|---|---|---|
| 01 gear position | 0 | | | | | | | | | 16.1 (increasing torque) | |
| 1 gear position | 0 | 0 | | | | | | | | 10.39 | 1.55 |
| 2 gear position | 0 | | 0 | | | | | | | 8.066 | 1.288 |
| 3 gear position | 0 | | | 0 | | | | | | 6.534 | 1..235 |
| 4 gear position | 0 | | | | 0 | | | | | 5.285 | 1..236 |
| 5 gear position | 0 | | | | | 0 | | | | 4.267 | 1.238 |
| 6 gear position | 0 | | | | | | 0 | | | 3.466 | 1.231 |
| 7 gear position | 0 | | | | | | | 0 | | 2.796 | 1.24 |
| 8 gear position | 0 | | | | | | | | 0 | 2.271 | 1.231 |

As shown in FIG. 1 and FIG. 2, the function of the brake 3 in the hybrid power system for use in the vehicle is to lock the power output shaft 2 of the engine 1, prevent it from rotating, and apply a restraining reaction torque to ring gear R during pure electric driving or energy regenerative braking; and when the engine needs to be rotated, the power output shaft of the engine is released so that it can rotate freely.

Figure 3:
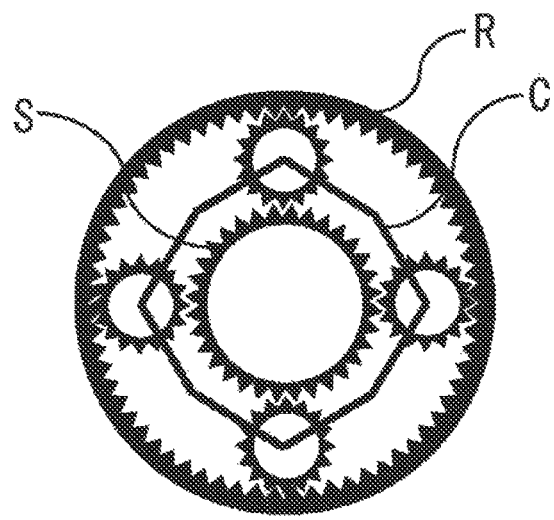
FIG. 3 is a schematic structural diagram of the planetary gear system in FIG. 1 and FIG. 2.
Figure 4:
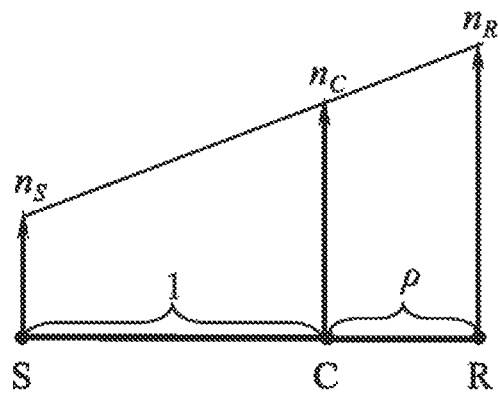
FIG. 4 is a lever representation diagram of the rotational speed of each rotating shaft in the planetary gear system in FIG. 3.

The kinematic relationship of all rotating shafts in the planetary gear system in FIG. 1 and FIG. 2 will be described with reference to FIG. 3 and FIG. 4.

The rotation axis of sun gear S, the rotation axis of planetary carrier C, and the rotation axis of ring gear R have the following kinematic constraint:

$$nR + \rho \cdot ns = (1+\rho) \cdot nc$$

$$\rho = S/R$$

Among them: nR, ns, and nc represent the rotational speeds of ring gear R, sun gear S, and planetary carrier C, respectively; R and S represent the number of teeth of ring gear R and sun gear S, respectively; this kinematic constraint can also be intuitively described by a lever diagram. As shown in FIG. 4, a lever is placed horizontally, and there are three points on it, S, C, R, respectively, representing sun gear S, planetary carrier C, and ring gear R; the distance between point S and point C is 1, the distance from point C to point R is $\rho = S/R$; vectors perpendicular to the lever are drawn from all points, representing the rotational speeds of sun gear S, planetary carrier C, and ring gear R respectively, then the vertices of the three vectors remain on a straight line. It can be seen from FIG. 4 that the rotational speed of planetary carrier C is always between the rotational speed of sun gear S and the rotational speed of ring gear R; the connection between the rotating shaft of ring gear R and the rotating shaft of sun gear S can be interchanged, and the function remains unchanged.

it, which represent the three rotating shafts respectively, and the distance between the points is determined by the parameters of the planetary gear system; a vector perpendicular to the lever is drawn from each point, representing the rotational speed of the shaft, and the three vector arrows are fixed on a straight line. It can be seen from FIG. 5 that the rotational speed of rotating shaft X2 is always between the rotational speed of rotating shaft X1 and the rotational speed of rotating shaft X3; the connections of rotating shaft X1 and rotating shaft X3 can be interchanged, and the function remains unchanged.

The power output shaft 2 of the engine 1 is connected to rotating shaft X3 of the planetary gear system and the second input shaft 12 of the dual input shaft speed change mechanism 20, the rotor 7 of the motor 6 is connected to rotating shaft X1, and rotating shaft X2 is connected to the first input shaft 11 of the dual input shaft gearbox 20. The first clutch 4 is arranged between any two rotating shafts of the planetary gear system to lock the three rotating shafts of the planetary gear system together so as to rotate at the same speed.

Figure 6:
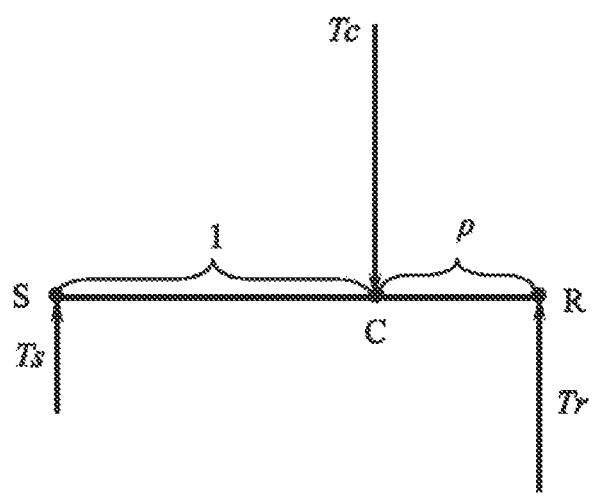
FIG. 6 is a torque diagram of each rotating shaft in the planetary gear system in FIG. 3.

The three rotating shafts in the planetary gear system bear torques, the sum of the torques on the rotating shaft of the sun gear is Ts, the sum of the torques on the rotating shaft of the ring gear is Tr, and the sum of the torques on the rotating shaft of the planetary carrier is Tc, as shown in the FIG. 6. When the first clutch is disengaged, the following relationships exist among these three torques:

$$Ts = \rho \cdot Tr$$

$$Tc = Ts + Tr$$

The motor 6 is connected with the rotating shaft of sun gear S and applies a driving torque Tm, Ts=Tm; the engine 1 is connected with the rotating shaft of ring gear R and the second input shaft 12, the driving torque of the engine is Ten, and the reaction torque of the second input shaft is T2, Tr=Ten−T2; the first input shaft 11 is connected to the rotating shaft of planetary carrier C, a reaction torque of the first input shaft T1=Tc; reaction torque T1 is actually the reaction torque of the torque output by the planetary carrier to the first input shaft, which is equal in magnitude and opposite in direction; reaction torque T2 is actually the reaction torque of the torque output from ring gear R to the second input shaft, which is equal in magnitude and opposite in direction.

The speed ratio of the engine: a ratio between the rotational speed of the power output shaft 2 of the engine 1 and the rotational speed of the gearbox output shaft is called the speed ratio. The hybrid power system of the present invention has n fixed shifting gear positions, and the speed ratios are $\eta_1, \eta_2, \eta_3, \ldots, \eta_n$, respectively. As long as one gear position is engaged at a time and the first clutch 4 is closed, the power output shaft 2 of the engine 1 can implement all of these gear positions one by one.

The specific situation is as follows: if it is to shift to an odd-numbered gear position i, the speed ratio of the first input shaft 11 is equal to the speed ratio $\eta_i$ of the gear position; the rotating shaft of planetary carrier C is connected to the first input shaft 11, and the speed ratio is also equal to $\eta_i$. Since the first clutch 4 is closed, the planetary gear system 5 is locked, the three rotating shafts rotate at the same speed, and the speed ratio of the rotating shaft of ring gear R and the power output shaft 2 of the engine 1 is also equal to $\eta_i$. Similarly, if the synchronizer is shifted to an even gear position j, the speed ratio of the second input shaft 12 is equal to the speed ratio $\eta_i$ of the gear position; the rotating shaft of ring gear R and the power output shaft 2 of the engine are connected with the second input shaft, and the speed ratio is also equal to $\eta_i$. Since the first clutch is closed, the planetary gear system 5 is locked, and the three rotating shafts rotate at the same speed, the speed ratio of the rotating shaft of sun gear S and the shaft of the motor is also equal to the speed ratio $\eta_i$ of the gear position.

Figure 7:
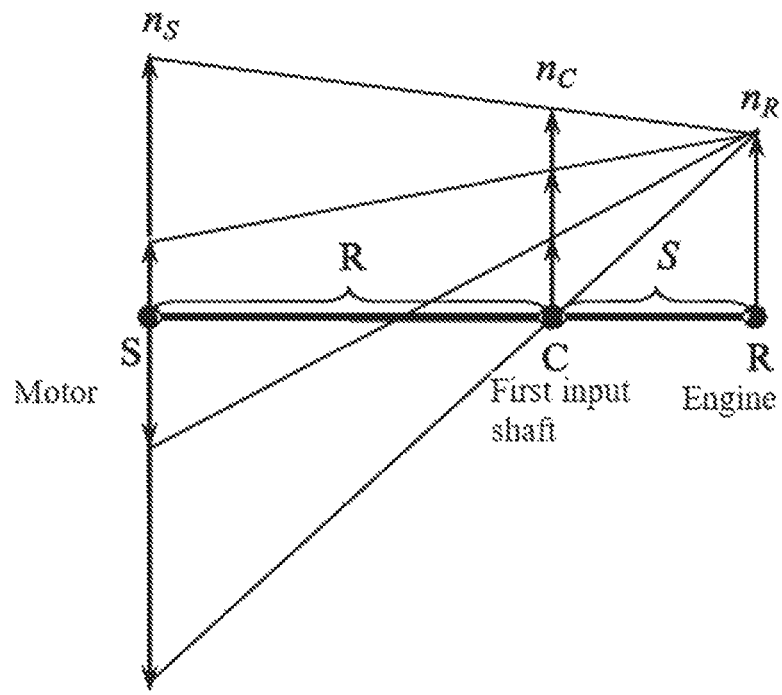
FIG. 7 is a lever representation diagram of the rotational speeds of three rotating shafts in a planetary gear system when the speed ratio of an engine changes continuously under HEV operating conditions.

In addition to the above n fixed gear positions, the hybrid power system of the present invention can also provide a continuous speed ratio for the engine during an acceleration process, provided that a battery can provide required electrical energy, see FIG. 7. The hybrid power system works as follows: the system is shifted to first gear position, the first clutch is disengaged, the engine and the motor are driven at differential speeds; the engine is maintained at a certain speed, the motor speed is constantly changing with the speed of the vehicle, and the speed ratio between the rotational speed of the engine and the first input shaft continuously changes, the speed ratio between the rotational speed of the engine and the output shaft also continuously changes. As long as the odd gear position is engaged, the system can realize continuous speed change. Continuous speed change can improve the fuel consumption of the vehicle in urban road conditions. Similarly, by shifting to other odd-numbered gear positions, the system can also achieve the continuous speed change within a certain range.

Figure 8:
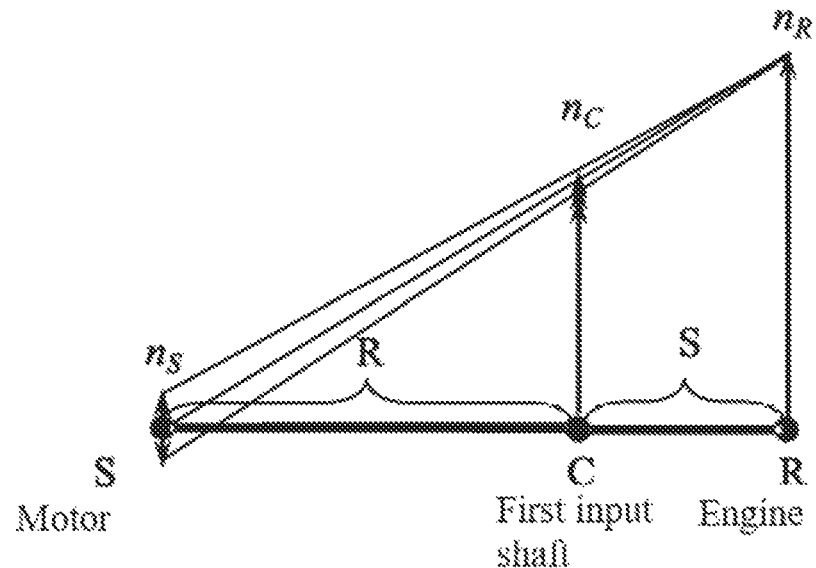
FIG. 8 is a lever representation diagram of the rotational speed of three rotating shafts in a planetary gear system when the rotational speed of a motor is controlled near zero rotational speed under HEV operating condition.

Referring to FIG. 8, in the case of driving at differential speeds, the hybrid power system of the present invention can provide a speed ratio for a long time, which is a quasi-fixed speed ratio. In the first gear position, the motor is near zero rotational speed, and the speed ratio of the engine is approximately equal to $(1+\rho)\cdot\eta_1$, which is larger than the speed ratio of the 1st gear position. For convenience, it is called 01 gear position. The motor can work near zero rotational speed for a long time, because when the rotational speed of the motor is close to zero, the power consumption is very small, and the power battery can supply power for a long time. There is another reason: the rotational speed of the motor can be greater than zero, which is an electric working condition where the electric energy in the battery is consumed; it can also be less than zero, which is a power generation working condition where the battery is charged. In this way, the motor can work for a long time near zero rotational speed, which basically ensures the balance of power in the battery. As a result, the system obtains an additional gear position/speed ratio, with a total of n+1 speed ratios, and the range of the speed ratio is also expanded to $(1+\rho)$ times.

In the control method for a hybrid power system for use in a vehicle, operating modes comprise: a pure electric mode, a pure engine driving mode, a hybrid power driving mode, and a charging mode.

Figure 9A:
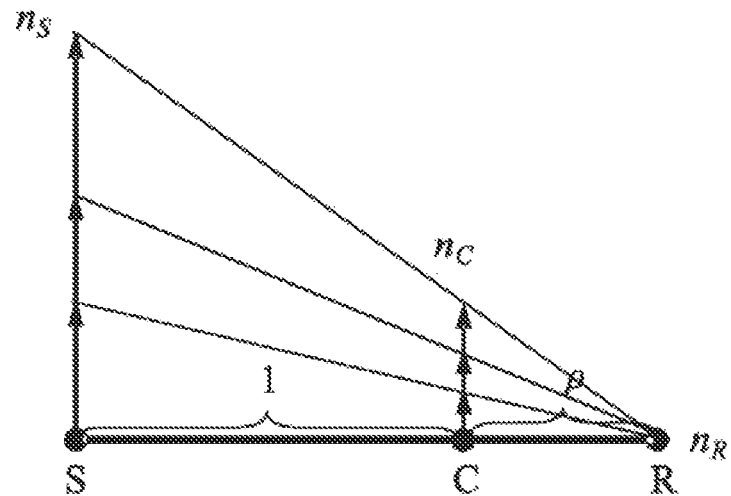
FIG. 9*a* is a lever representation diagram of the rotational speeds of three rotating shafts in the planetary gear system of the present invention in a pure motor driving mode.
Figure 9B:
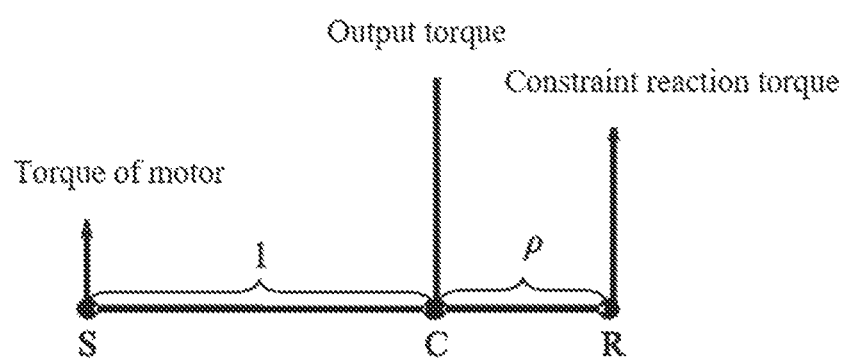
FIG. 9*b* is a lever representation diagram of the torques of three rotating shafts in the planetary gear system of the present invention when a vehicle is driven by a pure motor.

In the control method for a hybrid power system for use in a vehicle, operating conditions of the pure electric mode (EV mode) are:
1. the hybrid power system is shifted to an odd-numbered gear position, and the speed ratio is $\eta_i$; the first clutch 4 is disengaged, and the planetary gear system rotates at differential speeds; the brake 3 is closed, which restricts the rotation of the power output shaft 2 of the engine 1;
2. referring to FIG. 9a and FIG. 9b, the torque of the motor acts on the rotating shaft of sun gears, making it tend to rotate in a forward direction; the sun gear drives the planetary gear to rotate, and the planetary gear tends to drive the ring gear to rotate in a reverse direction; and the brake limits the reverse rotation of the ring gear, forcing planetary carrier C to rotate in the forward direction;
3. the torque of the motor is Tm, and the torque of the C-axis of the planetary carrier is $(1+1/\rho)\cdot Tm$;
4. the rotational speed of the motor is ns, the rotational speed of the rotating shaft of planetary carrier C is $ns/(1+1/\rho)$, and the total speed ratio of the motor drive is $(1+1/\rho)\cdot\eta_i$.

Figure 10A:
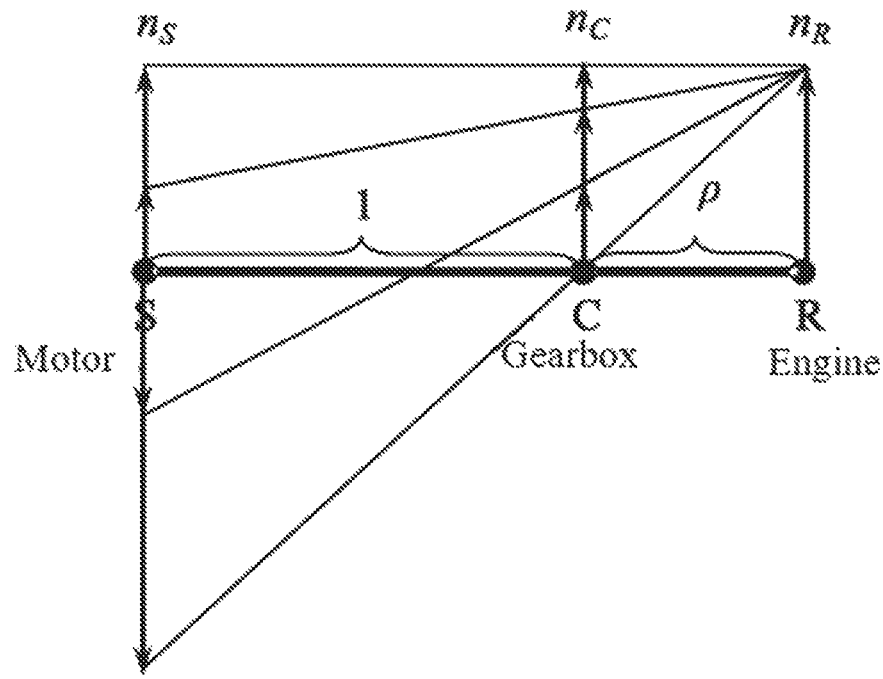
FIG. 10*a* is a lever representation diagram of the rotational speeds of three rotating shafts in the planetary gear system of the present invention during a starting process of driving a vehicle by an engine and a motor in a hybrid manner.
Figure 10B:
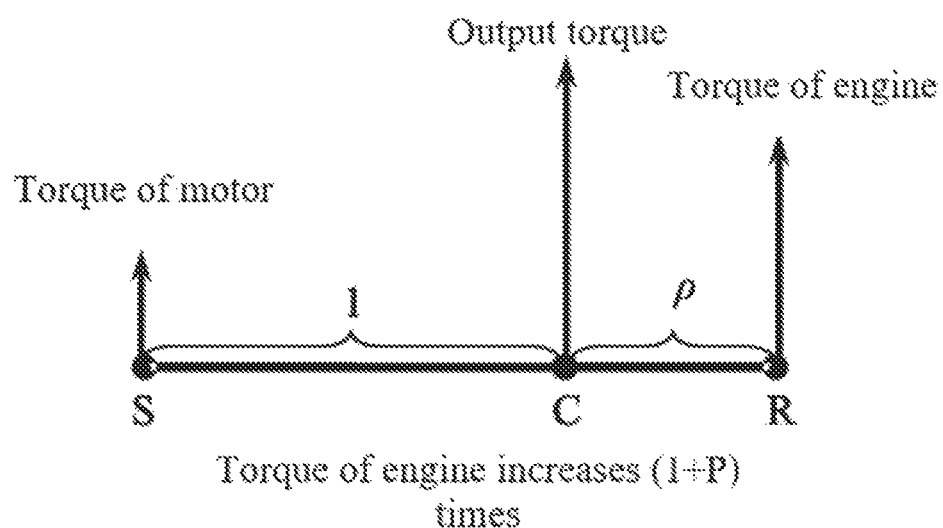
FIG. 10b is a lever representation diagram of the torques of three rotating shafts in the planetary gear system of the present invention during a starting process of driving a vehicle by an engine and a motor in a hybrid manner.

In the hybrid power system for use in a vehicle, operating conditions of the hybrid power driving mode (HEV mode) are:

Referring to FIG. 10a and FIG. 10b, when the engine and motor hybrid drive vehicle starts,
1. the hybrid power system is in the D gear position (a forward gear position), the gearbox is shifted to the first gear position, and the first clutch 4 is disengaged; before starting, the wheels are zero speed, the first input shaft 11 and the planetary carrier are also zero speed, the engine is idling, and the motor rotates in a reverse direction;
2. beginning to start: the engine increases the torque, the motor also increases the torque and increases the speed, drives the planetary carrier and the first input shaft to accelerate, and drives the wheels to rotate through the gearbox;
3. at this time, the engine and the motor drive at differential speeds, and the speed ratio between the engine and the wheels can be continuously changed, which optimizes the operating conditions of the engine and reduces the fuel consumption; and the speed-up process is short, and the battery power can support it;
4. the vehicle accelerates, the rotational speed increases, and the rotational speed of the planetary carrier increases;
5. when the rotational speed of the planetary carrier reaches a certain rotational speed, the first clutch is closed, the speed ratio between the engine and the wheels is fixed, and the first gear position is entered.

In the control method for a hybrid power system for use in a vehicle, under the condition of the hybrid drive mode of the engine and the motor, the operation steps of fixing the gear position are as follows:
1. the hybrid power system is shifted to an odd-numbered gear i, and the first clutch is closed; the speed ratio between the first input shaft and the planetary carrier is $\eta_i$; because the first clutch is closed, the three rotating shafts in the planetary gear system rotate at the same speed, the speed ratio between the ring gear and the engine is also equal to $\eta_i$; the torques of the engine and motor act on the rotating shaft of the sun gear S and the rotating shaft of the ring gear R respectively, and are superimposed through the planetary gear system, and are transmitted to the wheels through the first input shaft and the gear i in the gear position;
2. the hybrid power system is shifted to an even-numbered gear position j, and the first clutch is closed; the speed ratio between the second input shaft and the ring gear is $\eta_j$; since the first clutch is closed, the three rotating shafts in the planetary gear system rotate at the same speed, and the speed ratio between the ring gear and the engine is also equal to $\eta_i$; the torques of the engine and motor act on the rotating shaft of the sun gear S and the rotating shaft of the ring gear R respectively, and are superimposed through the planetary gear system, and are transmitted to the wheels through the second input shaft and the gear j in the gear position.

Figure 11A:
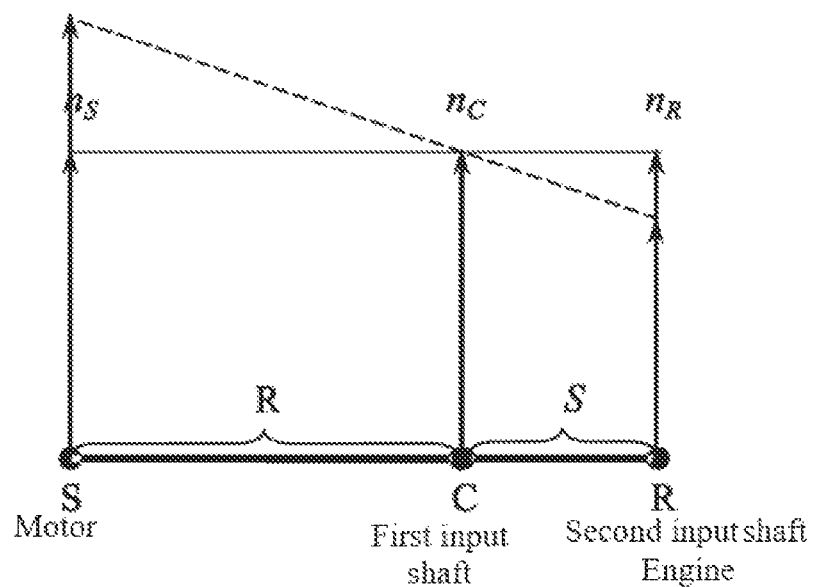
FIG. 11a is a lever representation diagram of the rotational speeds of three rotating shafts in the planetary gear system of the present invention in a process of switching from an odd-numbered gear position to an even-numbered gear position during hybrid drive.
Figure 11B:
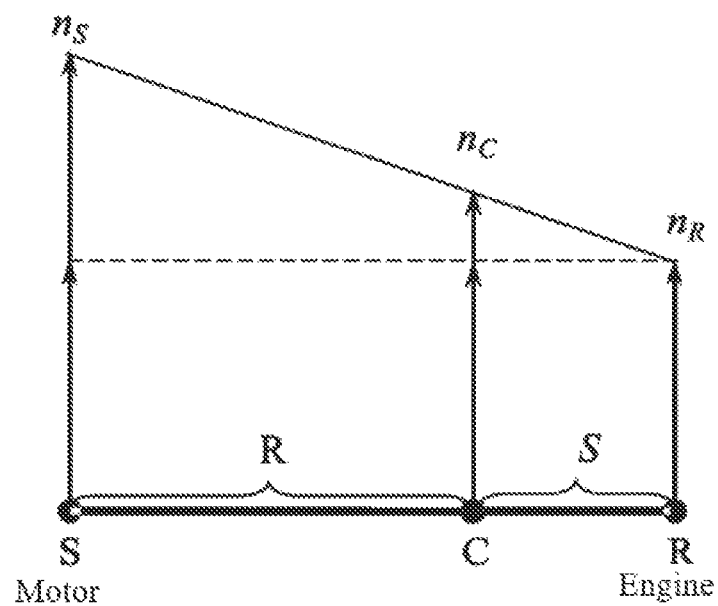
FIG. 11b is a lever representation diagram of the rotational speeds of three rotating shafts in the planetary gear system of the present invention in a process of switching from an odd-numbered gear position to an even-numbered gear position during hybrid drive.
Figure 12A:
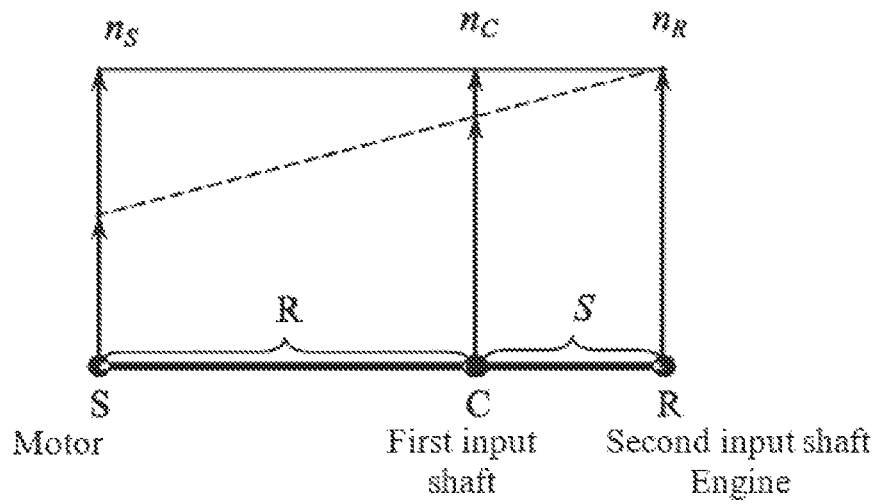
FIG. 12a is a lever representation diagram of the rotational speeds of three rotating shafts in the planetary gear system of the present invention in a process of switching from an even-numbered gear position to an odd-numbered gear position during hybrid drive.

Also provided in the present invention is a control method for a hybrid power system for use in a vehicle, wherein, in the hybrid drive mode of the engine and the motor, the steps of shifting gear positions are:
1. changing from the odd-numbered gear position to an adjacent even-numbered gear position, see FIG. 11a and FIG. 11b:
   (1) before shifting the gear position: the synchronizer is in the odd-numbered gear position, the speed ratio is the first clutch is closed, the planetary gear system is locked, and the engine and the motor parallelly drive the gear in the gear position, as shown by the horizontal solid line in FIG. 11a;
   (2) starting to shift the gear position: the torques of the engine and the motor are adjusted so that Tm=ρTen, the torque borne by the clutch is reduced to zero, and the sum of the adjusted torques is equal to the sum of the torques before the adjustment; where Tm is the motor driving torque, ρ=S/R, R and S represent the number of teeth of the ring gear and sun gear respectively, and Ten is the engine driving torque;
   (3) the first clutch is released, and the engine and the motor can be driven at different speeds; during this process, the torques of the motor and engine are balanced around the shaft of the planetary carrier, and the driving torque is equal to the torque before shifting the gear position;
   (4) the motor adjusts the speed of the rotating shaft of the sun gear S, and then drives the rotating shaft of the ring gear R and the second input shaft to adjust the speeds, so that the second input shaft is synchronized with the gear in a new gear position; in this process, the torques of the motor and the engine are balanced around the shaft of the planetary carrier, the driving torque is equal to the torque before shifting the gear position; the engine controls the torque, while the motor controls the speed of the sun gear, and controls the speed of the ring gear through the planetary gear system, so that the second input shaft and the gear to be shifted to the even-numbered gear position rotate at the same speed (synchronously), which is convenient for the gear position synchronizer to shift the gear position smoothly, as shown by the dotted line in FIG. 11a. Due to the fast response and high precision of the rotational speed control of the motor, it can improve the quickness and smoothness of the synchronizer in shifting the gear position, and reduce the impact of shifting the gear position.
   (5) the synchronizer is shifted to a new gear position (an even-numbered gear position), and the torque remains unchanged during this process, as shown by the oblique solid line in FIG. 11b;
   (6) the torque output by the motor is transferred to the power output shaft of the engine, the engine directly drives the second input shaft and the gear in the new gear position, the torque of the motor becomes zero, and the torques on the first input shaft and the gear in the original odd-numbered gear position are zero; in this process, the torque of the motor is transferred to the engine, and the driving torque is equal to the torque before shifting the gear position;
   (7) the synchronizer removes the original odd-numbered gear position;
   (8) the first clutch is closed, the planetary gear system is locked, and the engine and the motor parallelly drive the new gear in the new gear position; in this process, the torques of the motor and the engine can be adjusted and balanced, and the driving torque is equal to the torque before shifting the gear position, as shown by the dotted line in FIG. 11b.
2. changing from the even-numbered gear position to the adjacent odd-numbered gear position, see FIG. 12a and FIG. 12b;
   (1) before shifting the gear position: the synchronizer is shifted to the even-numbered gear position j, the speed ratio is $\eta_j$; the first clutch is closed, the planetary gear system is locked, and the engine and the motor parallelly drive the gear position, as shown by the solid line in FIG. 12a;
   (2) starting to shift the gear position: the torque output by the motor is transferred to the power output shaft of the engine, the engine directly drives the second input shaft and the gear in the original gear position, the torque of the motor becomes zero, and the torque on the clutch are zero; in this process, the torque of the motor is transferred to the engine, and the driving torque is equal to the torque before shifting the gear position;
   (3) the first clutch is released, and the three rotating shafts of the planetary gear system rotate at different speeds, and the torque remains unchanged during this process;
   (4) the motor adjusts the speed of the rotating shaft of the sun gear, and then drives the rotating shaft of the planetary carrier and the first input shaft to adjust the speeds, so that the first input shaft is synchronized with the gear in the new gear position, and the synchronizer in the gear position is easy to shift to a gear position, as shown by the dotted line in FIG. 12a; in this process, the torque of the engine directly acts on the second input shaft, wheels are driven through the gears in the even-numbered positions, and the torque is equal to the torque before shifting the gear position. Due to the fast response and high precision of the rotational speed control of the motor, it can improve the quickness and smoothness of the synchronizer in shifting the gear position, and reduce the impact of shifting the gear position.

Figure 12B:
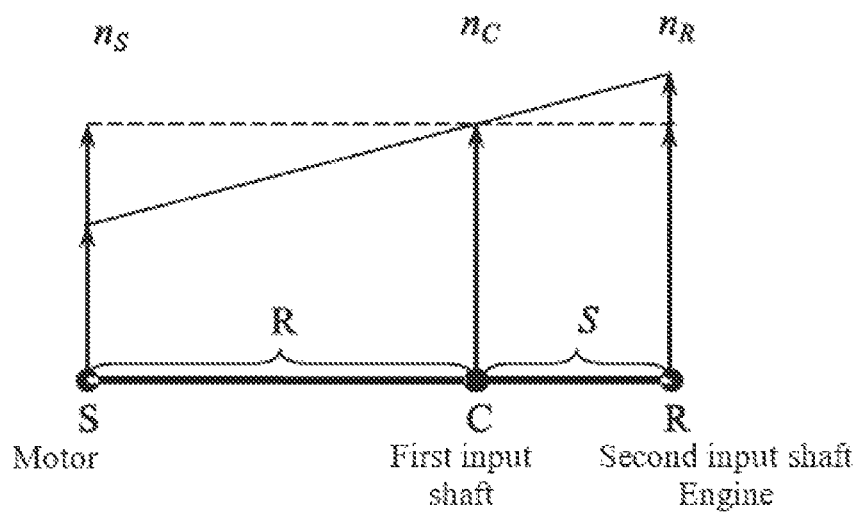
FIG. 12b is a lever representation diagram of the rotational speeds of three rotating shafts in the planetary gear system of the present invention in a process of switching from an even-numbered gear position to an odd-numbered gear position during hybrid drive.

(5) the synchronizer is shifted to a new gear position (an odd-numbered gear position), and the torque remains unchanged during this process, as shown by the solid line in FIG. 12b;
(6) the torques of the engine and the motor are adjusted so that Tm=ρTen, and the sum of the adjusted torques is equal to the sum of the torques before the adjustment, so that the torques on the second input shaft and the gear in the original gear position are reduced to zero, where Tm is the driving torque of the motor, ρ=S/R, R and S represent the number of teeth of the ring gear and sun gear respectively, Ten is the engine drive torque;
(7) the original odd-numbered gear position is removed, and the torque remains unchanged during this process;
(8) the first clutch is closed, the planetary gear system is locked, and the torques of the engine and the motor drive parallelly the gear in the new gear position; in this process, the torques of the motor and the engine can be adjusted and balanced, and the driving torque is equal to the torque before shifting the gear position, as shown by the dotted line in FIG. 12b.

In the control method for a hybrid power system for use in a vehicle according to the present invention, the steps of switching from the pure electric mode (the EV operating condition) to the hybrid power driving mode (the HEV operating condition) are:
(1) before the switching, the synchronizer is in an odd-numbered gear position i, the first clutch is disengaged, the brake locks the power output shaft of the engine, the motor drives the sun gear, and drives the first input shaft and the gear in a gear position through the planetary carrier;
(2) starting the switching: the brake is released, which allows the power output shaft of the engine to rotate; the first clutch is closed, and the three rotating shafts in the planetary gear system tend to rotate at the same speed, so that the power output shaft of the engine is driven to accelerate;
(3) in order to avoid large impact, the sliding friction torque of the first clutch is limited, and at the same time, the motor needs to increase the torque to compensate for torque loss;
(4) when the power output shaft of the engine reaches an ignition speed, the engine ignites and starts to work, and the system enters the hybrid power driving mode.

In the control method for a hybrid power system for use in a vehicle according to the present invention, the steps of switching from the hybrid power driving mode (the HEV operating condition) to the pure electrical mode (the EV operating condition) are:
(1) before the switching: the system is in an odd-numbered gear position, the synchronizer is in an odd-numbered gear position, the first clutch is closed, the brake is disengaged, and the engine and motor are driven in parallel; and, if the system is in an even-numbered gear position, it should be shifted to an odd-numbered gear position first;
(2) starting the switching: the first clutch is released, which allows the shaft of the engine to decelerate; the engine is turned off; the brake is closed, and the speed of the power output shaft of the engine is decreased to be zero and locked;
(3) the motor continues to drive the sun gear, and the system switches to the pure electric mode (the EV operating condition).

Figure 13:
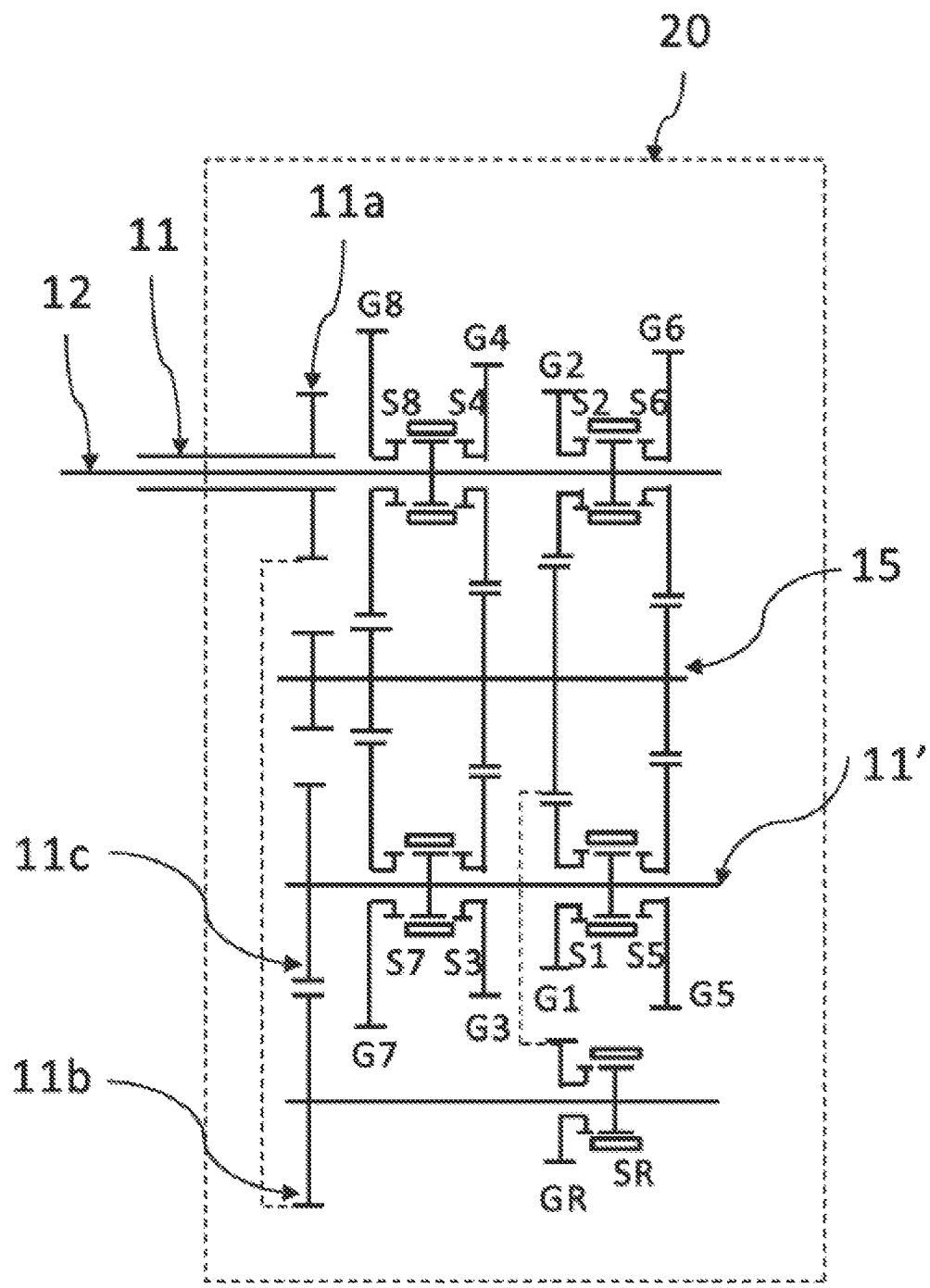
FIG. 13 is a schematic structural diagram of a first embodiment of a dual input shaft speed change mechanism used in the hybrid power system for use in the vehicle according to the present invention.

As shown in FIG. 13, the dual input shaft speed change mechanism 20 of the hybrid power system for use in a vehicle comprises a first input shaft 11, a second input shaft 12, several pairs of gears in forward gear positions, at least one set of gears GRs in reverse gear positions, and the output shaft 15; the front section of the first input shaft 11 is transmitted to the rear section 11' of the first input shaft through a two-stage gear, the gear 11a meshes with the gear 11b as the first-stage transmission, and the gear 11b meshes with the gear 11c as the second stage transmission; drive gears G1, G3, G5, G7 in the odd-numbered gear positions are arranged on the rear section 11' of the first input shaft, and are connected to the shaft through corresponding synchronizers S1, S3, S5, and S7; drive gears G2, G4, G6, and G8 in the even-numbered gear positions are arranged on the second input shaft 12, and are connected to the shaft through the corresponding synchronizers S2, S4, S6, and S8; the output shaft 15 is arranged with four driven gears in the gear positions, which are fixedly connected to the shaft. The 4 driven gears mesh with G1 and G2, G3 and G4, G5 and G6, G7 and G8 respectively; each driven gear meshes with two driving gears as a group to form two gear positions; there are a total of four groups, which means eight gear positions, and the required number of gears is small. Four rows of gears and two pairs of synchronizers are arranged along the axial direction, and the size in the axial direction is compact; and the change of the speed ratio between the gear positions is also reasonable.

Figure 14:
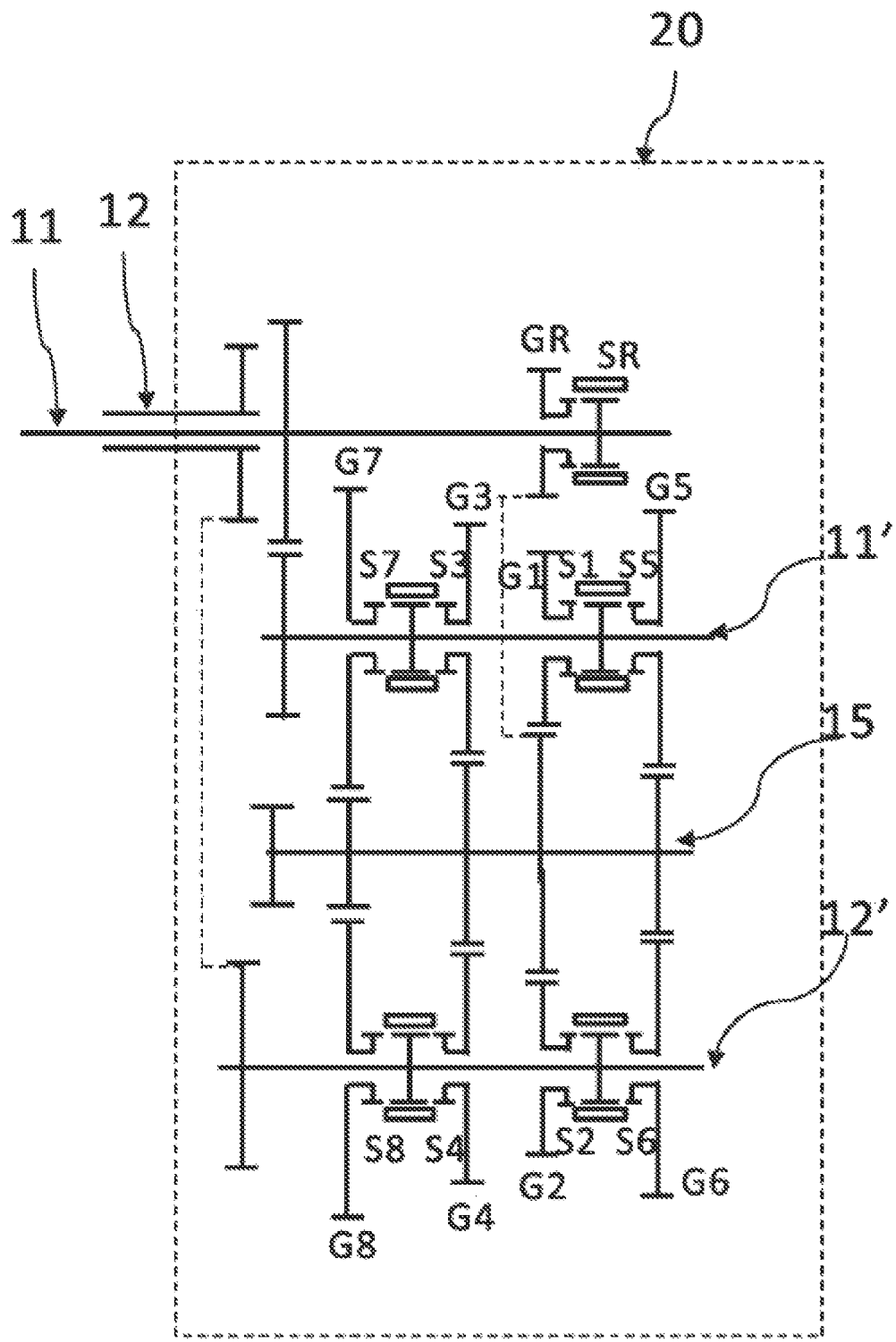
FIG. 14 is a schematic structural diagram of a second embodiment of a dual input shaft speed change mechanism used in the hybrid power system for use in the vehicle according to the present invention.

As shown in FIG. 14, the dual input shaft speed change mechanism 20 of the hybrid power system for use in a vehicle comprises a first input shaft 11, a second input shaft 12, several pairs of gears in forward gear positions, at least one set of gears GRs in reverse gear positions, and the output shaft 15; the front section of the first input shaft 11 is transmitted to the rear section 1F of the first input shaft through a one-stage gear, the front section of the second input shaft 12 is transmitted to the rear section 12' of the second input shaft through a one-stage gear; drive gears G1, G3, G5, G7 in the odd-numbered gear positions are arranged on the rear section 1F of the first input shaft, and are connected to the shaft by corresponding synchronizers S1, S3, S5, S7; drive gears G2, G4, G6, and G8 in the even-numbered gear positions are arranged on the rear section 12' of the second input shaft, and are connected to the shaft through the corresponding synchronizers S2, S4, S6, and S8; the output shaft 15 is arranged with four driven gears in the gear positions, which are fixedly connected to the shaft. The 4 driven gears mesh with G1 and G2, G3 and G4, G5 and G6, G7 and G8 respectively; each driven gear meshes with two driving gears as a group to form two gear positions; there are a total of four groups, which means eight gear positions, and the required number of gears is small. Four rows of gears and two pairs of synchronizers are arranged along the axial direction, and the size in the axial direction is compact; and the change of the speed ratio between the gear positions is also reasonable.

Figure 15:
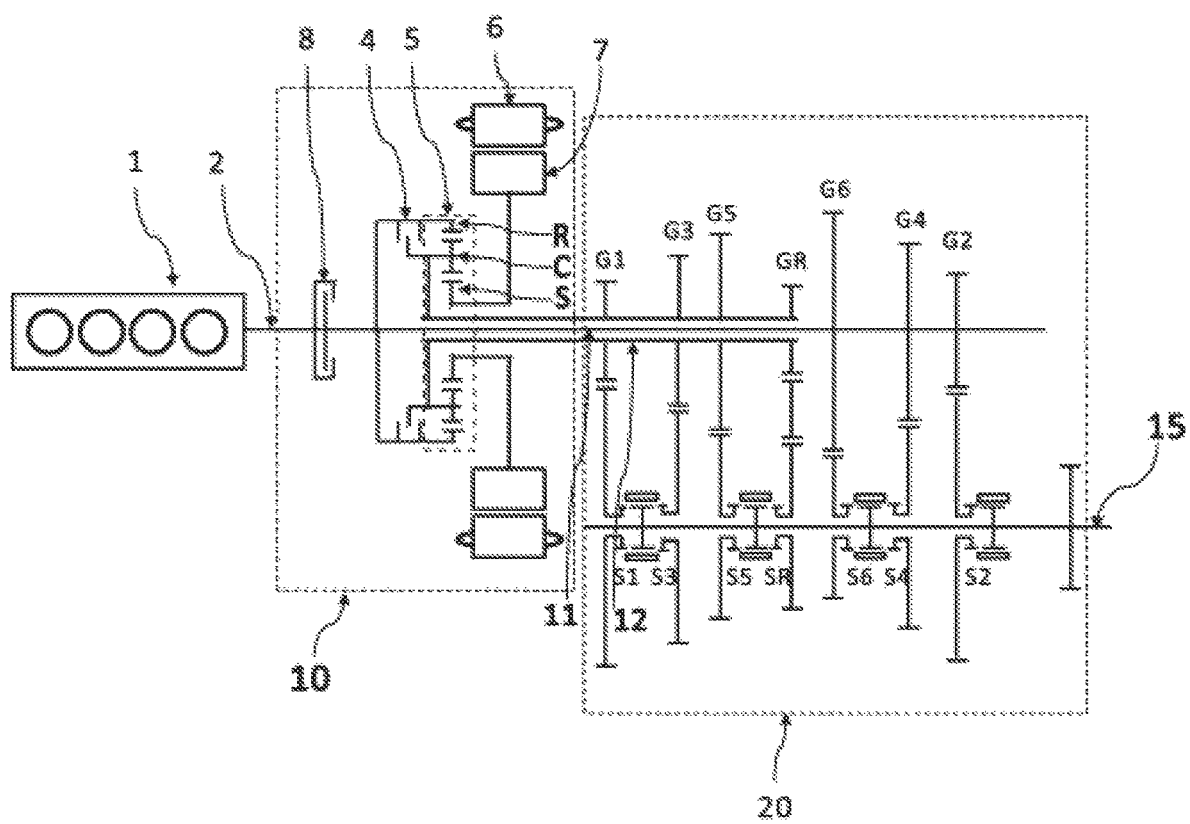
FIG. 15 is a schematic structural diagram of a third embodiment of a hybrid power system for use in a vehicle according to the present invention.

As shown in FIG. 15, in the hybrid power system for use in a vehicle, a second clutch 8 is installed on the power output shaft 2 of the engine 1; the second clutch 8 replaces the brake 3 in FIG. 1 and FIG. 2, and the others remain unchanged. During the pure electric drive: the second clutch 8 is disengaged, and the power output shaft 2 of the engine is separated from the hybrid power module 20; an odd-numbered gear position is engaged; the first clutch 4 is closed, the entire planetary gear system is locked together, rotates at the same speed, and the motor outputs the torque and drives through the planetary gear system and gears in the gear position. When the engine and the motor drive in combination: the second clutch 8 is closed, and the power output shaft 2 of the engine is connected with the relevant rotating shaft in the planetary gear system; and all other functions and implementation methods remain unchanged.

Also protected in the present invention is a vehicle comprising the above hybrid power system.

The above descriptions are only preferred embodiments of the present invention, rather than limitations of the present invention. Without departing from the spirit and scope of the present invention, all equivalent changes and modifications made according to the scope of the patent application of the present invention shall belong to the scope of patent protection of the present invention.

What is claimed is:

1. A hybrid power system for use in a vehicle, wherein the system comprises an engine, a hybrid power module, and a dual input shaft speed change mechanism, the hybrid power module comprises an motor, a planetary gear system, a first clutch, and a torque transmitting device, the planetary gear system is provided with at least three rotating shafts, which respectively are: a rotating shaft X1, a rotating shaft X2, and a rotating shaft X3, the axial lines of the three rotating shafts being on a straight line, and the rotational speed of the rotating shaft X2 falling between the rotational speed of the rotating shaft X1 and the rotational speed of the rotating shaft X3; the first clutch is arranged between any two of the three rotating shafts; a power output shaft of the engine is continuously connected to the rotating shaft X1 of the planetary gear system and to a second input shaft of the dual input shaft speed change mechanism, a rotor of the motor is connected to the rotating shaft X3, the rotating shaft X2 is connected to a first input shaft of the dual input shaft speed change mechanism; the torque transmitting device is installed on the power output shaft of the engine; the dual input shaft speed change mechanism comprises the first input shaft, the second input shaft, several pairs of gears in a forward gear position, at least one set of gears in a reverse gear position and an output shaft, the first input shaft is provided with a driving gear in an odd-numbered gear position, the second input shaft is provided with a driving gear in an even-numbered gear position, and the output shaft is arranged with driven gears in respective gear positions, and the driving gears in the respective gear positions are meshed with the corresponding driven gears;

in the case that the hybrid power system changes from an odd-numbered gear position to an adjacent even-numbered gear position, the torques of the motor and the engine are balanced around a shaft of a planetary carrier and the first clutch is released, the motor drives the second input shaft to adjust speeds through the planetary gear system so that the second input shaft is synchronized with the gear in a new gear position;

in the case that the hybrid power system changes from an odd-numbered gear position to an adjacent even-numbered gear position, the torque of the motor is set to zero and the torque of the motor is transferred to the engine, then the first clutch is released, the motor drives the first input shaft to adjust speeds through the planetary gear system, so that the first input shaft is synchronized with the gear in the new gear position.

2. The hybrid power system for use in a vehicle according to claim 1, wherein the driving gears in the gears in a reverse gear position are provided on the first input shaft.

3. The hybrid power system for use in a vehicle according to claim 1, wherein one gear in each gear position is connected to the shaft on which the gear is located through a synchronizer.

4. The hybrid power system for use in a vehicle according to claim 1, wherein the output shaft comprises a first output shaft and a second output shaft, which are respectively arranged with several driven gears.

5. The hybrid power system for use in a vehicle according to claim 1, wherein the first input shaft comprises a front section of the first input shaft and a rear section of the first input shaft, the front section of the first input shaft is transmitted to the rear section of the first input shaft through a chain or a two-stage gear; and driving gears in the odd-numbered gear positions are arranged on the rear section of the first input shaft; or the second input shaft comprises a front section of the second input shaft and a rear section of the second input shaft, the front section of the second input shaft is transmitted to the rear section of the second input shaft through a chain or a two-stage gear; and driving gears in the even-numbered gear positions are arranged on the rear section of the second input shaft.

6. The hybrid power system for use in a vehicle according to claim 1, wherein the first input shaft comprises a front section of the first input shaft and a rear section of the first input shaft, the second input shaft comprises a front section of the second input shaft and a rear section of the second input shaft; the front section of the first input shaft is transmitted to the rear section of the first input shaft through a gear or a chain, and the front section of the second input shaft is transmitted to the rear section of the second input shaft through a gear or a chain; the rear section of the first input shaft is arranged with driving gears in the odd-numbered gear positions; the rear section of the second input shaft is arranged with driving gears in the even-numbered gear positions.

7. The hybrid power system for use in a vehicle according to claim 1, wherein the torque transmitting device is a brake.

8. The hybrid power system for use in a vehicle according to claim 1, wherein operating modes of the hybrid power system comprises: a pure electric mode, a pure engine driving mode, a hybrid power driving mode, and a charging mode.

9. A control method for a hybrid power system for use in a vehicle according to claim 8, wherein, in the hybrid power driving mode, the steps of shifting gear positions are:

I) changing from an odd-numbered gear position to an adjacent even-numbered gear position
(1) before shifting the gear position: the synchronizer is in the odd-numbered gear position, the first clutch is closed, the planetary gear system is locked, and the engine and the motor parallelly drive the gear in the gear position;
(2) starting to shift the gear position: the torques of the engine and the motor are adjusted so that $Tm=\rho Ten$, the torque borne by the first clutch is reduced to zero, and a sum of the adjusted torques is equal to a sum of the torques before the adjustment;
where Tm is a motor driving torque, $\rho=S/R$, R and S represent a number of teeth of a ring gear and sun gear respectively, and Ten is an engine driving torque;
(3) the first clutch is released, and the engine and the motor are driven at different speeds; during this process, the torques of the motor and the engine are balanced around the shaft of the planetary carrier, and the driving torque is equal to the torque before shifting the gear position;
(4) the motor adjusts the speed of the rotating shaft of the sun gear, and then drives the rotating shaft of the ring gear and the second input shaft to adjust speeds, so that the second input shaft is synchronized with the gear in a new gear position; in this process, the torques of the motor and the engine are balanced around the shaft of the planetary carrier, the driving torque is equal to the torque before shifting the gear position; the engine performs torque control, the motor controls the speed of the sun gear, and controls the speed of the ring gear through the planetary gear system, so that the second input shaft and the gear to be shifted to the even-numbered gear position rotate at the same speed, which is convenient for the synchronizer in the gear position to shift smoothly;

(5) the synchronizer is in a new gear position, and the torque remains unchanged during this process;

(6) the torque output by the motor is transferred to the power output shaft of the engine, the engine directly drives the second input shaft and the gear in the new gear position, the torque of the motor becomes zero, and the torques on the first input shaft and the gear in the original odd-numbered gear position are zero; in this process, the torque of the motor is transferred to the engine, and the driving torque is equal to the torque before shifting the gear position;

(7) the synchronizer removes the original odd-numbered gear position;

(8) the first clutch is closed, the planetary gear system is locked, and the engine and the motor parallelly drive the gear in the new gear position; in this process, the torques of the motor and the engine can be adjusted and balanced, and the driving torque is equal to the torque before shifting the gear position;

II) changing from an odd-numbered gear position to an adjacent even-numbered gear position (1) before shifting the gear position: the synchronizer is in the even-numbered gear position, the first clutch is closed, the planetary gear system is locked, and the engine and the motor parallelly drive the gear in the gear position;

(2) starting to shift the gear position: the torque output by the motor is transferred to the power output shaft of the engine, the engine directly drives the second input shaft and the gear in the original gear position, the torque of the motor becomes zero, and the torque on the clutch is zero; in this process, the torque of the motor is transferred to the engine, and the driving torque is equal to the torque before shifting the gear position;

(3) the first clutch is released, and the three rotating shafts of the planetary gear system rotate at different speeds, and the torque remains unchanged during this process;

(4) the motor adjusts the speed of the rotating shaft of the sun gear, and then drives the rotating shaft of the planetary carrier and the first input shaft to adjust speeds, so that the first input shaft is synchronized with the gear in the new gear position; in this process, the torque of the engine directly acts on the second input shaft, wheels are driven through the gear in the even-numbered gear position, and the torque is equal to the torque before shifting the gear position;

(5) the synchronizer is in a new gear position, and the torque remains unchanged during this process;

(6) the torques of the engine and the motor are adjusted so that $Tm=\rho Ten$, and the sum of the adjusted torques is equal to the sum of the torques before the adjustment, so that the torques on the second input shaft and the gear in the original gear position are reduced to zero, where Tm is the driving torque of the motor, $\rho=S/R$, R and S represent the number of teeth of the ring gear and sun gear respectively, Ten is the engine driving torque;

(7) the original odd-numbered gear position is removed, and the torque remains unchanged during this process;

(8) the first clutch is closed, the planetary gear system is locked, and the torques of the engine and the motor drive parallelly the new gear in the new gear position; in this process, the torques of the motor and the engine can be adjusted and balanced, and the driving torque is equal to the torque before shifting the gear position.

10. The control method according to claim 9, wherein, the steps of switching from the pure electric mode to the hybrid power driving mode are:

(1) before the switching, the synchronizer is in an odd-numbered gear position, the first clutch is disengaged, the torque transmitting device locks the power output shaft of the engine, the motor drives the sun gear, and drives the first input shaft and the gear in a gear position through the planetary carrier;

(2) starting the switching: the torque transmitting device is released, the first clutch is closed, and the three rotating shafts in the planetary gear system tend to rotate at the same speed, the power output shaft of the engine is driven to accelerate;

(3) a sliding friction torque of the first clutch is limited, and at the same time, the motor increases the torque to compensate for torque loss;

(4) when the power output shaft of the engine reaches an ignition speed, the engine ignites and starts to work, and the hybrid system enters the hybrid power driving mode.

11. A vehicle comprising the hybrid power system according to claim 1.

* * * * *